Patented Sept. 7, 1937

2,092,625

UNITED STATES PATENT OFFICE 2,092,625

PURIFICATION OF SULPHUR

Raymond Clyde Rich, Houston, Tex., assignor to Shell Development Company, San Francisco, Calif., a corporation of Delaware No Drawing. Application June 17, 1935,
Serial No. 27,045

8 Claims. (Cl. 23—229)

This invention relates to a novel process for the purification of sulphur contaminated with carbonaceous materials.

More particularly the invention provides a practical and economical process for the purification of sulphur contaminated with hydrocarbons, petroleum oils, asphalt, tar and the like carbonaceous material which comprises treating the contaminated sulphur at a temperature at which the carbonaceous material reacts with the sulphur, for a time sufficient to effect substantially complete reaction, and separating the end products of the reaction from the treated material.

The process is applicable with excellent results to the purification of sulphur containing petroleum oil. Oil contaminated sulphur is obtained, in many cases, when sulphur is recovered by means of the Frasch process from deposits of the native element in close proximity to petroleum oil deposits. Sulphur contaminated with a sufficient amount of carbonaceous material as carbon, oil, hydrocarbons, tars, pitches, asphaltic material and the like is discolored and is unsuitable for purposes where a substantially pure product possessing the characteristic bright yellow color of sulphur is desired. Carbonaceous impurities as petroleum oils have a decided detrimental influence on the burning qualities of the sulphur. In burning sulphur contaminated with oil, the oil reacts with the sulphur to form an asphaltic material and/or carbon which spreads over the surface of the burning sulphur and, due to its much greater ignition temperature, extinguishes the flame. Consequently, the burning of oil contaminated sulphur necessitates the use of devices which by agitation or other means break the surface film of asphaltic material or carbon and thus allow combustion of the sulphur.

Heretofore no practical or effective process has been proposed for the purification of sulphur contaminated with carbonaceous materials. Attempts have been made to effect purification by extraction and by chemical treatment; the methods devised have not warranted commercial application where a relatively high percent of impurity was present due to their ineffectiveness and the prohibitive cost of the materials and equipment necessitated.

The present invention provides a simple, economical and highly effective process whereby sulphur contaminated with carbonaceous materials can be readily converted to a highly purified product equal in quality to the best sulphur obtained from native deposits or by chemical means.

My invention is based upon the discovery that on heating the contaminated sulphur, in a molten state, at a temperature sufficiently high, the carbonaceous materials present therein can be made to rapidly and substantially completely react with the sulphur to form reaction end products which may be readily and substantially completely separated from the treated material resulting in a substantially pure sulphur.

In the purification of oil contaminated sulphur, the invention may be executed as follows: the contaminated sulphur in either the molten or the solid state is charged to a suitable reaction vessel equipped with heating means. Iron, glass, glass-lined or other suitable reaction vessels may be employed. The crude sulphur is heated to the temperature at which reaction of the sulphur with the carbonaceous material occurs at a practical rate. The reaction, in the majority of cases, starts at temperatures below about 500° F. but usually it does not occur at a practical rate until temperatures of about 500° F. are reached. I preferably employ temperatures of from about 500° F. to about 600° F., although higher or lower temperatures may in some cases be desired. About 500° F. to 600° F. has been found to be a practical and suitable temperature, although, the higher the temperature the more rapidly the reaction proceeds. The material is maintained at the desired temperature for a time sufficient to effect substantially complete reaction. In the majority of cases, at a temperature of from 500° F. to 600° F. the reaction is substantially complete in from about 15 min. to about 30 min., the higher temperatures requiring a shorter reaction time.

When the reaction is effected under conditions at which substantially all of the carbonaceous material reacts, the main products of the reaction are hydrogen sulphide and carbon, although other gaseous as well as solid end products may in some cases result. In accordance with the invention, carbonaceous materials which cannot be readily separated from the molten sulphur by distillation, filtration, extraction and the like means, are substantially completely converted to end products as hydrogen sulphide and carbon which are readily removable.

During the execution of the process, foaming of the liquid accompanied by the evolution of gaseous reaction products, principally $H_2S$, can be noted. The evolved gas may be continuously or intermittently vented from the reaction vessel. If desired, the $H_2S$ may be recovered by absorption in a suitable solvent therefor.

The process may be executed in a reaction vessel open to the atmosphere or it may be executed in a closed reaction vessel at an atmospheric or superatmospheric pressure. The treatment is in general more advantageously effected in closed reaction vessels under pressures greater than atmospheric. The gaseous reaction products evolved aid in building up and maintaining an elevated pressure which inhibits foaming. When operating in a closed system, the rate of reaction may be accelerated by passing a substance which is gaseous and substantially inert under operating conditions through the molten reaction mixture. The gaseous material serves to agitate the mixture and carry gaseous products of reaction from the system. Suitable substances which may be advantageously used for this purpose are air, steam, nitrogen, carbon dioxide and the like. If desired, the gaseous products of the reaction may be separated therefrom and the inert gaseous material reutilized in the same or another reaction unit.

The sulphur may be recovered in the desired degree of purity from the treated material in a variety of suitable manners, for example, by distillation, filtration, extraction and the like means.

When distillation methods of recovery are resorted to, the mixture is heated to its boiling temperature and the sulphur is distilled therefrom as pure sulphur, the carbonaceous end product or products of the reaction, usually carbon, remaining as a residue in the distilling apparatus. The distillation may or may not be made from the same vessel in which the purification reaction is effected. Due to foaming which occurs during the purification reaction, carbon particles may be deposited on the walls and outlets of the reaction vessel and carried over with the distillate thereby contaminating it. This contamination due to the mechanical carrying over of carbon particles with the distillate may be avoided by refluxing the treated sulphur to clear the walls and the outlets prior to effecting distillation. In general, in operating in a batch manner, I prefer to effect the purification reaction in one reaction vessel and the distillation in another. The purification reaction may be effected in an open or closed reaction vessel and the liquid treated material conducted to one or more communicating reaction vessels wherein distillation is effected.

Subsequent to the heat treatment to convert the carbonaceous materials in the sulphur to end products readily separable therefrom, the treated material may be filtered and the solid carbonaceous material separated. The molten treated material may be filtered through fuller's earth, filter clay, diatomaceous earth, fine sand, asbestos and the like or an arrangement of such materials together. The molten material is caused to pass through the filter at atmospheric or elevated pressure by means of a pump, or by air or steam pressure. The filter serves to retain any solid matter as carbon and the filtrate is a substantially pure sulphur. A particularly advantageous method of separating carbon from the treated sulphur comprises percolating the treated material through Attapulgus clay. Another method is contact filtration using finely divided filter clay. By this method the molten sulphur is contacted with the clay which is subsequently removed by means of a filter press. If desired acid treatment may be resorted to prior to contact filtration.

The following specific example is illustrative of the process as applied to the purification of oil contaminated sulphur. It is to be understood that the invention is not to be considered as limited to the specific operating conditions disclosed.

*Example*

Oil contaminated sulphur containing about 3.49% of hydrocarbon impurities was charged to an open iron reaction vessel and heated. At a temperature of about 500° F. the reaction started to occur at a practical rate as was evidenced by foaming and the liberation of $H_2S$. The reaction appeared to be exothermic. The temperature was maintained at from about 500° F. to about 600° F. for about 30 minutes. At the end of this time evolution of gas had ceased and there was no more evidence of reaction. The molten treated material was conducted to a glass retort and distilled. The distillate was substantially free of carbonaceous materials and analyzed as 100% sulphur.

The process of my invention may be executed in a batch, intermittent or continuous manner. The molten crude sulphur as it flows from the wells at a temperature of about 300° F. may be conducted to a plurality of reaction stages in communication with each other and one or a plurality of distillation or filtration stages. If desired the process may be executed in an intermittent manner by effecting reaction in a closed reaction vessel under atmospheric or superatmospheric pressure, preferably while passing a relatively inert gas through the system to sweep out gaseous reaction products. After allowing a sufficient time to effect substantially complete reaction, the sulphur may be distilled in a substantially pure condition from the same reaction vessel if means are employed to prevent mechanical carrying over of carbon particles.

While my invention has been described with particular reference to its application to the purification of oil contaminated sulphur obtained from native sulphur deposits, it is to be understood that the same is broadly applicable to the removal of carbonaceous materials from sulphur regardless of the source of the contaminated sulphur. Sulphur contaminated with carbon may be filtered or distilled in accordance with my invention and a pure sulphur obtained without resorting to heat treatment.

It will be obvious to those skilled in the art to which this invention appertains that modifications may be made, in addition to those described herein, without departing from the spirit of my invention, and it is my intention to cover in the claims such modifications as are included within the scope thereof.

I claim as my invention:

1. A process for purifying sulphur from oil and similar carbonaceous material which comprises heating the sulphur at a temperature of from about 500° F. to about 600° F., under a pressure substantially greater than atmospheric for a time sufficient to effect substantially complete reaction of the carbonaceous material therewith, and separating the end products of reaction from the treated material.

2. A process for purifying sulphur from oil and similar carbonaceous material which comprises heating the sulphur, while maintaining it under a pressure substantially greater than atmospheric during the heating from the temperature at which reaction first begins up to the final reaction temperature, to a temperature at which the carbonaceous material reacts therewith at a practical rate, maintaining the temperature and pressure for a time sufficient to effect substantially complete reaction, and separating the reaction products from the treated material.

3. In a process for purifying sulphur from oil and similar carbonaceous material, the step which comprises heating the sulphur, while maintaining it under a pressure substantially greater than atmospheric during the heating from the temperature at which reaction first begins up to the final reaction temperature, to a temperature at which the carbonaceous material reacts therewith, and maintaining the temperature and pressure for a time sufficient to effect substantially complete reaction.

4. In a process for purifying sulphur from oil and similar carbonaceous material, the step which comprises heating the sulphur to a temperature of from about 500° F. to about 600° F. under a pressure substantially greater than atmospheric for a time sufficient to effect substantially complete reaction of the carbonaceous material and sulphur.

5. In a process for purifying sulphur from oil and similar carbonaceous material, the step which comprises heating the sulphur to a temperature of from about 500° F. to about 600° F. under a pressure substantially greater than atmospheric for a time sufficient to effect substantially complete reaction of the carbonaceous material therewith, while passing air through the treated material to sweep gaseous reaction products from the system.

6. A process of purifying sulphur from oil and similar carbonaceous material which comprises heating the sulphur, while maintaining it under a pressure substantially greater than atmospheric during the heating from the temperature at which reaction first begins up to the final reaction temperature, to a temperature at which the carbonaceous material reacts therewith, maintaining the temperature and pressure for a time sufficient to effect substantially complete reaction, removing gaseous products of the reaction, and distilling the treated material to recover sulphur from the solid reaction products.

7. A process for purifying sulphur from oil and similar carbonaceous materials which comprises heating the sulphur at a temperature of from about 500° F. to about 600° F. under a pressure substantially greater than atmospheric, for a time sufficient to effect substantially complete conversion of the carbonaceous material to gaseous reaction products and carbon while passing air through the reaction mixture to remove the gaseous reaction products, and physically treating the carbon-contaminated sulphur to recover a substantially pure sulphur therefrom.

8. A process for purifying sulphur from oil and similar carbonaceous material which comprises heating the sulphur in a closed reaction vessel, to a temperature at which the carbonaceous material reacts therewith while maintaining a pressure at least equal to the combined vapor pressures of the constituents of the reaction mixture at the operating temperature in the reaction vessel during the heating from the temperature at which reaction first begins up to the final reaction temperature, and maintaining the temperature and pressure, for a time sufficient to effect substantially complete conversion of the carbonaceous material to gaseous reaction products and carbon, removing gaseous reaction products, and filtering the treated material, in a molten state, to separate carbon therefrom.

RAYMOND CLYDE RICH.